Figure 1:
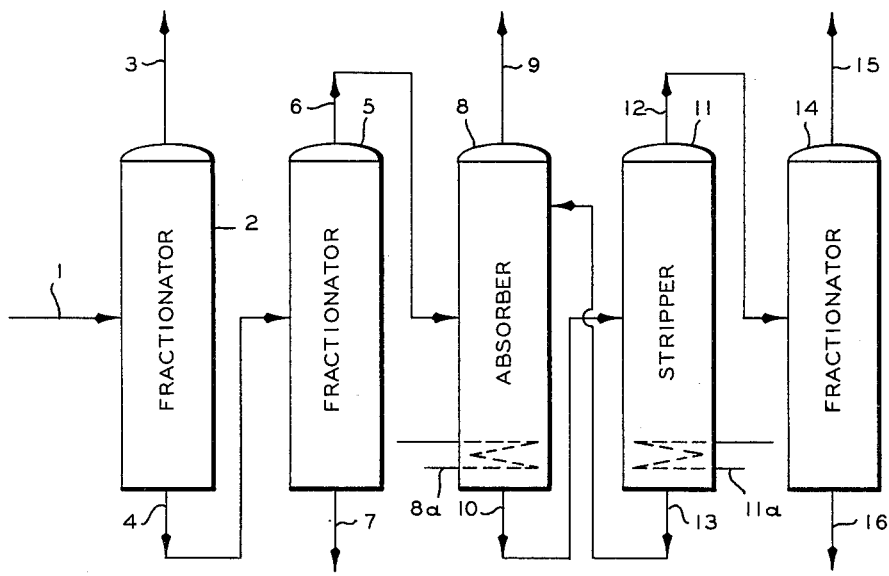

Dec. 19, 1961   H. A. CLAY   3,013,952
SEPARATION OF BUTENE-1 FROM BUTADIENE AND ACETYLENES
Filed Jan. 30, 1958   2 Sheets-Sheet 1

INVENTOR.
H.A. CLAY
BY Hudson and Young
ATTORNEYS

United States Patent Office 3,013,952
Patented Dec. 19, 1961

3,013,952
SEPARATION OF BUTENE-1 FROM BUTADIENE
AND ACETYLENES
Harris A. Clay, Bartlesville, Okla., assignor to Phillips Petroleum Company, a corporation of Delaware
Filed Jan. 30, 1958, Ser. No. 712,173
3 Claims. (Cl. 202—39.5)

This invention relates to the separation of hydrocarbon mixtures into their various components. In one aspect it relates to a method for recovery of butene-1, free from acetylenes, from gaseous mixtures containing same. In another aspect the invention relates to an improvement in the extractive distillation procedures employed in the separation of butadiene-1,3 from admixture with butanes, butenes, and acetylenes.

In recent years the production of butadiene has become increasingly important because of its use in the manufacture of synthetic rubber. However, in order to obtain butadiene having the necessary purity required for successful polymerization into synthetic rubber, means must be provided for separating butadiene from the numerous other hydrocarbons normally formed along with butadiene by the cracking or dehydrogenation of selected hydrocarbons. Several processes have been proposed for the segregation and purification of butadiene and one of the more successful processes is disclosed in U.S. Patent 2,415,006, issued to K. H. Hachmuth, January 28, 1947. In the above referred to systems the segregation process steps are directed to the purification and recovery of butadiene and the streams resulting from the process which contain $C_4$ hydrocarbons other than butadiene are recycled to the dehydrogenation steps or are discarded from the system as being of too great molecular weight or too small in molecular weight. The butene-1 which results from the dehydrogenation of butane along with butadiene, acetylenes, butenes-2 and isobutylene has been passed to a second dehydrogenation step for dehydrogenation into butadiene. Acetylenes and other impurities are not normally removed from the butene-1 stream since these impurities will be destroyed in the dehydrogenation step or will be removed in later purification steps.

There are other uses to which butene-1 can be put and therefore it will be advantageous to recover butene-1 from the products of dehydrogenation of butane free from acetylenes as impurities. At the present time there is a considerable and growing demand for 1-olefins including butene-1 for the manufacture of solid olefin polymers and solid olefin copolymers. If the butene-1 fraction resulting from the dehydrogenation of butane can be recovered free of acetylenes it will provide a source of raw material for the growing solid polymer industry.

It is well known that many solvents, such as furfural, either aqueous or dry, exhibit selectivity for acetylenes such as methylacetylene, vinyl acetylene, ethylacetylene, dimethylacetylene and the like over butadiene, butylenes and butanes. On the basis of this knowledge the occurrence of acetylenes in the overhead product of the extractive distillation column is unexpected; however in the prior art process of purifying butadiene the butene-1 stream contains more acetylenes than can be tolerated in some applications for which the butene-1 is intended; for example the polymerization of butene-1 to form normally solid polymers.

I have discovered that the occurrence of acetylenes in overhead product of the extractive distillation column can be prevented substantially by efficient stripping of the extract from the solvent in the stripping step which follows the extractive distillation step. Poorly stripped solvent releases some of its content of acetylenes in the top section of the extractive distillation column, thus contaminating the raffinate.

The prior art method of control does not provide a means to obtain the stripping required to eliminate acetylenes from the butene-1 stream.

It is therefore a principal object of this invention to provide a method for the recovery of butene-1 free from admixture with acetylenes resulting from the dehydrogenation of butane.

It is also an object of the invention to provide a butene-1 stream free from acetylenes in a process for recovering butadiene from products of dehydrogenation.

It is another object of this invention to provide an improved method of extractive distillation for the separation of butadiene-1,3 from butene-1.

It is a further object of this invention to provide an improved method for the recovery of solvent used in the extractive distillation method of separating butadiene-1,3 from butene-1.

Other objects and advantages of this invention will be apparent to one skilled in this art upon study of the disclosure including the following detailed description taken in conjunction with the accompanying drawing.

Figure 2:
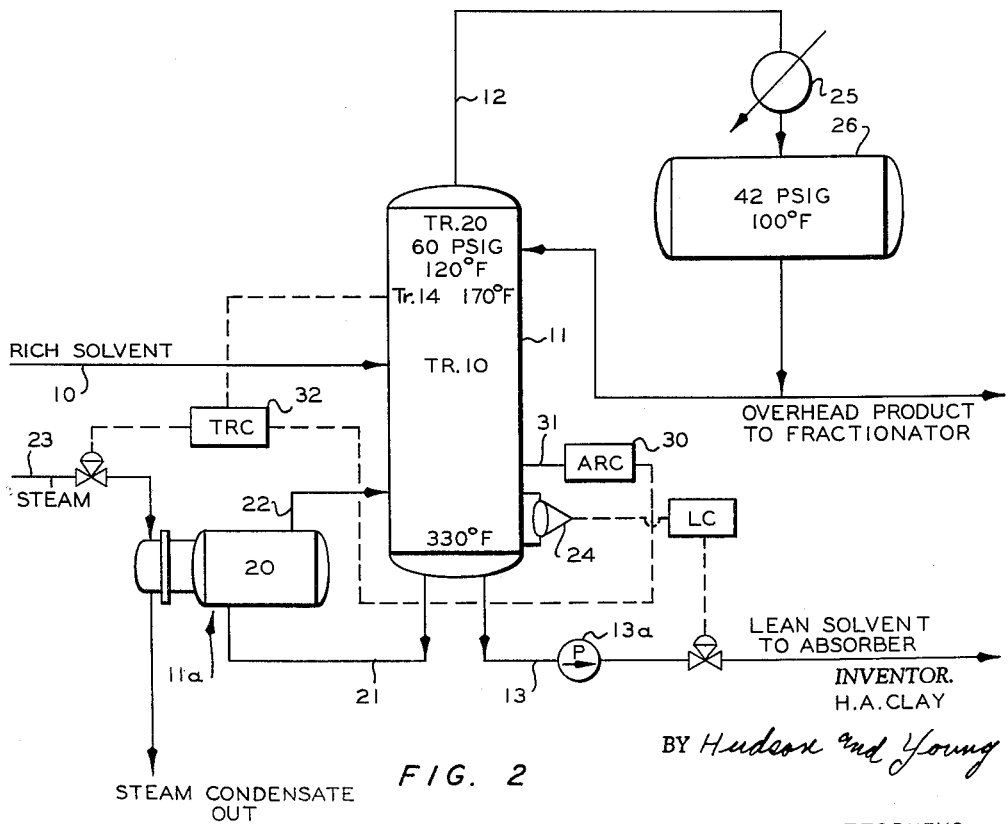
Figure 3:
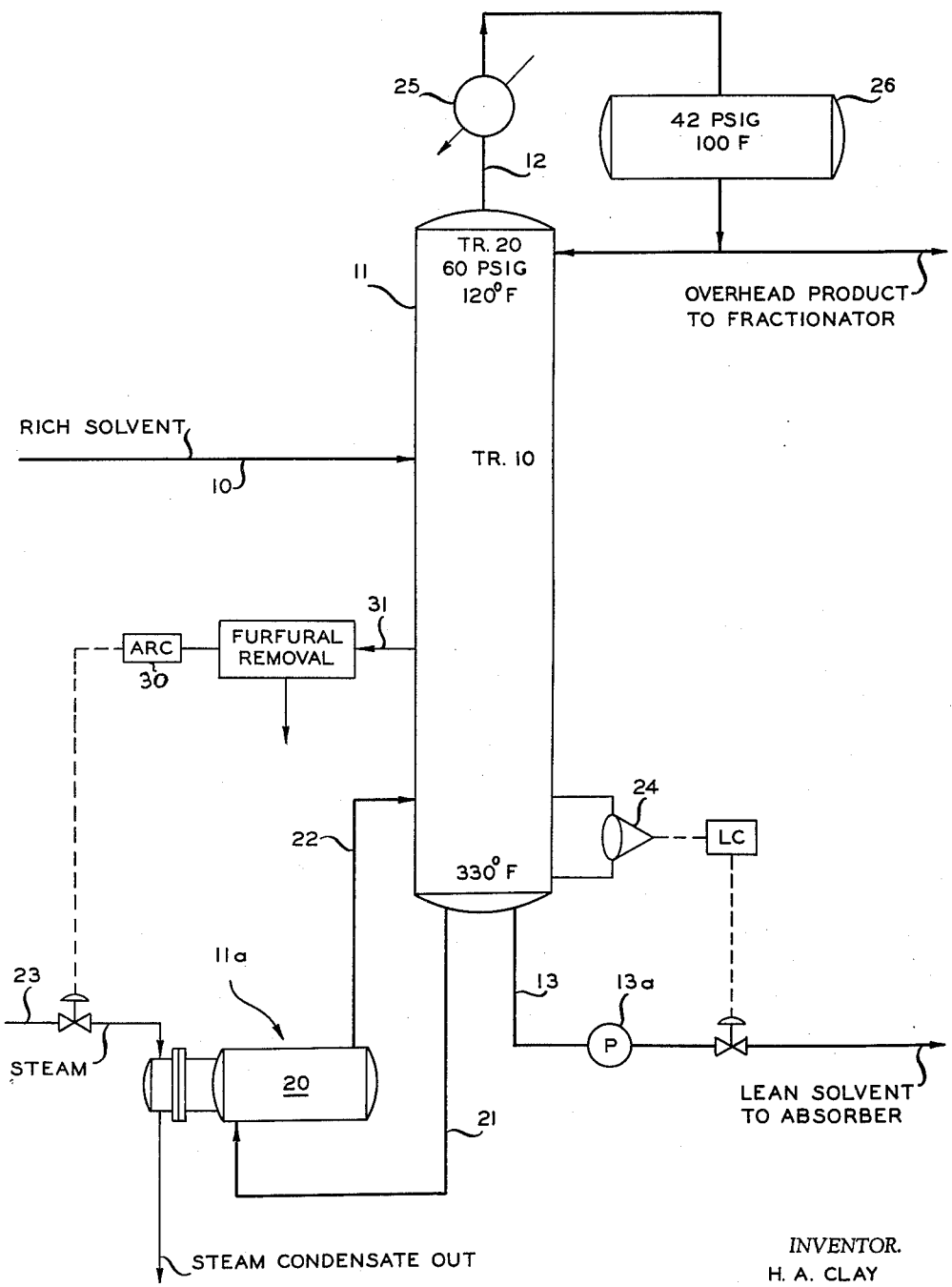

FIGURE 1 is a schematic illustration of a butadiene purification system wherein the invention is practiced.
FIGURE 2 is a preferred embodiment of the invention.
FIGURE 3 is a modification of the embodiment of the invention of FIGURE 2.

Referring to the drawing and particularly to FIGURE 1 a butadiene-containing feed derived from the catalytic dehydrogenation of $C_4$ olefins is passed via conduit 1 to depropanizer 2 from whence $C_3$ and lighter hydrocarbons are removed overhead via conduit 3 and $C_4$ and heavier hydrocarbons are removed as kettle product via conduit 4 and are passed to fractionator 5 which makes a cut in the butene-2 fraction so that $C_5$ and heavier hydrocarbons, including some butene-2, are removed via conduit 7 as kettle product. The $C_4$ fraction removed from fractionator 5 as overhead product comprises butadiene, butene-1, isobutylene, butanes, acetylenes, and some butene-2, and is passed via conduit 6 to absorber 8 from whence the raffinate comprising butene-1, isobutylene, butanes, some butene-2, but substantially no acetylenes, when operated according to the invention, is removed from absorber 8 via conduit 9. An extractive distillation is conducted in absorber 8 in the presence of an absorbent, such as furfural, which is introduced to absorber 8 via conduit 13. Heat is supplied to absorber 8 by means of heat exchanger 8a which can be steam reboiler or any other desired type of heat exchanger. The rich solvent resulting from the extractive distillation in absorber 8 and comprising solvent, butadiene, butene-2, and acetylenes, is removed from absorber 8 via conduit 10 and is passed to stripper 11 wherein heat is added by means of heat exchanger 11a and the hydrocarbons dissolved in the solvent are removed as overhead product via conduit 12 and passed to fractionator 14 from whence substantially pure butadiene is removed overhead via conduit 15 and butene-2 and acetylenes are removed as kettle product via conduit 16. Lean furfural, substantially completely free of acetylenes, is removed from the bottom of stripper 11 and passed to the top of absorber 8 as the source of solvent for the extractive distillation carried out therein.

Referring now to FIGURE 2 the invention will be described in more detail as applied to the operation of stripper 11 of FIGURE 1. The rich solvent recovered from absorber 8 passes to column 11 via conduit 10 as heretofore shown in FIGURE 1 and heat is supplied to stripper 11 by means of the heat exchanger indicated at 11a. The heat exchanger indicated as 11a in FIGURE 1 is shown as an external reboiler 20 in FIGURE 2 and it receives liquid from stripper 11 via conduit 21 and returns heated fluid to stripper 11 via conduit 22. Reboiler 20 received heat from steam conduit 23. Lean solvent is removed from stripper 11 and is passed via conduit 13 and pump 13a to absorber 8. The rate of flow of solvent is controlled by liquid level controller 24.

The overhead product from stripper 11 passes via conduit 12 and cooler 25 to hydrocarbon condensate accumulator 26. A portion is returned to stripper 11 as reflux and the remainder is passed to fractionator 14.

An analyzer 30 which is sensitive to acetylenes, such as infrared, mass or ultraviolet spectrometer, chromatographic analyzer or other suitable analyzer measures the amount of acetylenes in a sample taken from the vapor of a tray between the feed and the reboiler of the stripper and passed to the analyzer via conduit 31. The analyzer 30 can conveniently be a recording controlled analyzer and can be adapted to control the steam passed via conduit 23 to reboiler 20 in response to the acetylenes content of the sample obtained via conduit 31 and in this modification of the invention the temperature recording controller 32 shown in FIGURE 2 is omitted. If desired the sample stream in conduit 31 can be treated to remove furfural, for example, by a water wash. An alternate analyzing procedure comprises taking the sample to be analyzed from conduit 13 and stripping the sample substantially completely, for example, with $N_2$ prior to analyzing.

A preferred modification is illustrated in FIGURE 2 wherein temperature recording controller 32 controls the amount of steam passed via conduit 23 to reboiler 20 in response to the temperature at a reference point in stripper 11, e.g., tray 14 which can be maintained at a temperature such as 170° F. Analyzer recording controller 30 resets temperature recording controller 32 when the amount of acetylenes in the sample obtained via conduit 31 reaches a predetermined maximum so as to operate stripper 11 with a temperature on tray 14 higher than 170° F., in order to maintain the amount of acetylenes appearing in the sample obtained via conduit 31 below a predetermined maximum value. The analyzer will be set to control within a predetermined range of acetylenes content of sample conduit 31 so as to control the acetylenes content of the butene-1 stream within a predetermined range of acetylenes content.

In the embodiment of FIGURE 3 the sample obtained via conduit 31 is passed to the analyzer recording controller 30. The controller 30 controls steam valve 23 in accordance with the acetylene content of the sample. Furfural can be removed in the furfural removal step referred to hereinbefore.

Analyzer 30 can be an infrared analyzer adapted to provide an electrical signal, the magnitude of which is indicative of the concentration of acetylenes present in the sample passed via conduit 31. An infrared analyzer such as is described in U.S. Patent 2,579,825, issued December 25, 1951, to J. W. Hutchins is applicable for use in the present invention.

The analyzer overrides a temperature recording controller 32 such as that described in Foxboro Bulletin 450 on page 52 in connection with a pneumatic index set, page 55. The Foxboro Bulletin is available from Foxboro Instrument Co., Foxboro, Mass.

Alternatively the analyzer, such as an infrared analyzer, can be utilized to provide a signal, indicative of the acetylenes content of the stream in conduit 31, to a controller such as a commercially available Brown Air-O-Line potentiometer air operated controller described in Catalog No. 8905 of the Brown Instrument Company, Philadelphia, Pennsylvania. The controller then controls the heat to the stripper directly in response to the signal from the analyzer.

It is understood that a source of compressed air, usually about 20 p.s.i.g., is employed to operate the controls, such as motor valves, and that the source of air is not shown. Other items which are conventional also are not shown but one skilled in the art will know when and where to use such items as motors, pumps, valves and the like.

For purpose of description, reference is made to a particular separation according to the method of the prior art and the same separation made with the aid of the control system of the invention.

*Table I*

| Component | Stripper 11 Feed, lb. mols/hr. | Stripper 11 Overhead (Prior Art Control), lb. mols/hr. | Stripper 11 Bottoms | |
|---|---|---|---|---|
| | | | Prior art control, lb. mols/hr. | New control, lb. mols/hr. |
| Methylacetylene | 0.1 | 0.1 | | |
| Isobutylene | 0.2 | 0.2 | | |
| Butene-1 | 3.8 | 3.8 | | |
| Butadiene | 416.2 | 406.2 | 10.0 | 0.2 |
| trans-Butene-2 | 64.8 | 63.6 | 1.2 | 0.02 |
| cis-Butene-2 | 12.0 | 11.7 | 0.3 | 0.006 |
| Ethylacetylene and Vinylacetylene | 6.1 | 2.0 | 4.1 | 0.2 |
| Furfural | 12,481.6 | | 12,481.6 | 12,481.6 |
| Water | 2,774.8 | | 2,774.8 | 2,774.8 |

The separation in the stripper of the prior art leaves about 0.1 mol percent of $C_4$'s in the solvent whereas the method of the present invention leaves only about 0.0028 mol percent of $C_4$'s in the solvent and reduces the acetylenes content of the butene-1 stream recovered from the extractive distillation column to tolerable amounts for the purposes contemplated.

The solvent (furfural) stripper is operated at a pressure of about 65 p.s.i.a. with a reflux ratio of about 1:1; a top temperature of about 103° F.; and a bottom temperature of about 300° F. The extractive distillation step is practiced according to the procedure of the prior art in the process of the invention because the purity of the extractive distillation overhead product, with respect to acetylenes, results from the substantially complete removal of acetylenes from the solvent in the stripping step.

The amount of acetylenes in the butene-1 stream of the prior art is in the order of 200 to 600 p.p.m. when about 0.1 mol percent or about 675 p.p.m. by weight of $C_4$'s are returned with the solvent and according to the process of the present invention this is reduced to the order of 9 to 20 p.p.m. when the $C_4$'s returned with the solvent are reduced to about 0.0028 mol percent or about 18 p.p.m. by weight.

Variations and modifications are possible within the scope of the disclosure without departing from the spirit and scope of the invention.

That which is claimed is:

1. The method of substantially eliminating acetylenes from the overhead product of the butene-1 extractive distillation step in the process for recovering butadiene from a mixture of hydrocarbons including butadiene, butene-1 and acetylenes wherein butadiene and acetylenes are absorbed in an extractive distillation step without substantial absorption of butene-1, the butene-1 is recovered as the overhead product in the extractive distillation step, the rich solvent is passed to a stripping step for removal of absorbed hydrocarbons and lean solvent is then returned to the extractive distillation step, which method comprises supplying sufficient heat to said stripping step to maintain the $C_4$ hydrocarbon content of the solvent returned to the extractive distillation step at a value of not more than about .0028 mol percent.

2. The method of substantially eliminating acetylenes from the overhead product of the butene-1 extractive distillation step in the process for recovering butadiene from a mixture of hydrocarbons including butadiene, butene-1 and acetylenes wherein butadiene and acetylenes are absorbed in an extractive distillation step without substantial absorption of butene-1, the butene-1 is recovered as the overhead product in the extractive distillation step, the rich solvent is passed to a stripping step for removal of absorbed hydrocarbons and lean solvent is then returned to the extractive distillation step, which method comprises measuring the acetylenes content of the solvent in said stripping step at a point below the feed to the stripping step; and supplying sufficient heat to said stripping step to maintain the $C_4$ hydrocarbon content of the solvent returned to the extractive distillation step at a value of not more than about 18 p.p.m.

3. The method of substantially eliminating acetylenes from the overhead product of the butene-1 extractive distillation step in the process for recovering butadiene from a mixture of hydrocarbons including butadiene, butene-1 and acetylenes wherein butadiene and acetylenes are absorbed in an extractive distillation step without substantial absorption of butene-1, the butene-1 is recovered as the overhead product in the extractive distillation step, the rich solvent is passed to a stripping step for removal of absorbed hydrocarbons and lean solvent is then returned to the extractive distillation step, which method comprises measuring the acetylenes content of the vapor in contact with the solvent in the bottoms product of said stripping step and supplying sufficient heat to said stripping step to maintain the acetylenes content of the overhead product stream from the extractive distillation step within the limits of about 9 to about 20 p.p.m.

References Cited in the file of this patent

UNITED STATES PATENTS

| | | |
|---|---|---|
| 2,281,282 | Gerhold | Apr. 28, 1942 |
| 2,415,006 | Hachmuth | Jan. 28, 1947 |
| 2,684,326 | Boyd | July 20, 1954 |
| 2,696,464 | Mathis et al. | Dec. 7, 1954 |
| 2,709,678 | Berger | May 31, 1955 |
| 2,771,149 | Miller et al. | Nov. 20, 1956 |